(12) United States Patent
Noda

(10) Patent No.: US 7,525,741 B1
(45) Date of Patent: Apr. 28, 2009

(54) TWO-PIECE OPTICAL LENS SYSTEM FOR TAKING IMAGE

(75) Inventor: Sayuri Noda, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 12 days.

(21) Appl. No.: 11/868,521

(22) Filed: Oct. 7, 2007

(51) Int. Cl.
*G02B 9/04* (2006.01)
*G02B 13/18* (2006.01)
*G02B 3/06* (2006.01)

(52) U.S. Cl. ........................ 359/795; 359/717
(58) Field of Classification Search ......... 359/795, 359/717, 692
See application file for complete search history.

(56) References Cited

U.S. PATENT DOCUMENTS 7,035,018 B2 * 4/2006 Yamakawa ............... 359/717
7,236,315 B2 * 6/2007 Chen et al. ............... 359/795

* cited by examiner

*Primary Examiner*—Alicia M Harrington
(74) *Attorney, Agent, or Firm*—Banger Shia

(57) ABSTRACT

A two-piece optical lens system for taking image comprises, from the object side: a first lens element and a second lens element. The first lens element is a positive meniscus lens element has a convex object-side surface. The second lens element is a negative meniscus lens element has a convex image-side surface. Both the object-side surface and the image-side surface of the first and second lens elements are aspheric, the first and second lens elements are made of plastic material, and they satisfy the relations: $0.55 < f1/f < 0.95$, $-2.0 < f2/f < -1.0$, $27.0 < v1 - v2$. The focal length of the optical lens system is f, the focal length of the first lens element is f1, the focal length of the second lens element is f2, the Abbe number of the first lens element is v1, and the Abbe number of the second lens element is v2.

14 Claims, 18 Drawing Sheets

TWO-PIECE OPTICAL LENS SYSTEM FOR TAKING IMAGE

BACKGROUND OF THE INVENTION

1. Field of the Invention

The present invention relates to a two-piece optical lens system for taking image, and more particularly to a miniaturized two-piece optical lens system for taking image used in a mobile phone camera.

2. Description of the Prior Art

The present invention relates to an optical lens system for taking image, from the object side comprises: an aperture stop, a first lens element and a second lens element, which is particularly suitable for use in the miniaturized portable machines with a high optical performance.

With the price coming down, the high resolution (1-3 million pixels) mobile phone cameras are usually made up of three lens elements. And the researchers are also required to design the optical lens system consisting of two lens elements, but such an optical lens system has a main problem, that is, the characteristic of an incident angle of the optical lens system will get worse.

However, the slightly poor characteristic of the incident angle of the optical lens system can still be used in the microlens elements of the solid image sensor such as CCD or CMOS.

Conventional plastic material is still not good enough to meet the demands for high optical performance, but in recent years, the plastic lens material is being refined constantly, and with the use of new material, the required optical performance has been realized.

Therefore, Japan Pat. Nos. 2004-170460, 2005-121685, 2006-154517, and 2006-178026 disclose several two-piece optical lens systems for taking image, and the aperture stop is located at the object side, so that the exit pupil of the optical lens system will be far away from the image plane and a good incident angle is ensured.

The disadvantages of the above patents lie in:

The cost of the first lens element made of glass of Japan Pat. No. 1 is high, and the refractive power of the second lens element is too weak, so that the chromatic aberration will not be sufficiently corrected.

The first and second lens elements of Japan Pat. Nos. 2 and 4 are made of the same material, so that the chromatic aberration will not be sufficiently corrected, and the high optical performance can not be ensured.

The second lens element of Japan Pat. No. 3 is a negative lens element has a convex object-side surface, the concave image-side surface is difficult to manufacture, and the peripheral edge of the second lens element leans to the image side, so that the back focal length can not be ensured.

The present invention mitigates and/or obviates the afore-described disadvantages.

SUMMARY OF THE INVENTION

The primary objective of the present invention is to provide an optical lens system for taking image comprises, from the object side: an aperture stop, a first lens element and a second lens element.

The first lens element is a positive meniscus lens element has a convex object-side surface.

The second lens element is a negative meniscus lens element has a convex image-side surface.

Both the object-side surface and the image-side surface of the first and second lens elements are aspheric, and the first and second lens elements are made of plastic material, and they satisfy the relations:

$$0.55 < f1/f < 0.95 \quad (1)$$

$$-2.0 < f2/f < -1.0 \quad (2)$$

$$27.0 < v1-v2 \quad (3)$$

The focal length of the optical lens system is f, the focal length of the first lens element is f1, the focal length of the second lens element is f2, the Abbe number of the first lens element is v1, and the Abbe number of the second lens element is v2.

The optical lens system for taking image comprises the first lens element and the second lens element. The first lens element is a positive meniscus lens element has the convex object-side surface. The second lens element is a negative meniscus lens element has the convex image-side surface. Both the object-side surface and the image-side surface of the first and second lens elements are aspheric, and the first and second lens elements are made of plastic material. If the value of f1/f is lower than the lower limit of the relation (1), the refractive power of the first lens element will become too strong, the back focal length will become short, and the astigmatic difference and comatic aberration will not be good. If the value of f1/f is higher than the upper limit of the relation (1), the positive refractive power of the first lens element will become weak, and the total length of the optical lens system will become too long.

If the value of f2/f is lower than the lower limit of the relation (2), the refractive power of the second lens element will become too small, the chromatic aberration of magnification will not be sufficiently corrected, so that the peripheral performances will be worse. If the value of f2/f is higher than the upper limit of the relation (2), the negative refractive power of the second lens element will become too strong. Thereby, in order to balance the chromatic aberration, the positive refractive power of the first lens element must become strong, so that the manufacturing error of the eccentric also becomes large.

If the value of v1-v2 is lower than the lower limit of the relation (3), the chromatic aberration will not be sufficiently corrected, so that the requirement of the solid image sensor such as CCD or CMOS with a high resolution can not be satisfied.

When the optical lens system of the present invention satisfies the relations (1),(2),(3), the aberration can be corrected effectively, and the high optical performance of the optical lens system can be provided.

And it will be better if the present invention satisfies the relation:

$$0.85 < TL/f < 1.15 \quad (4)$$

The distance from the object-side surface of the first lens element to the image plane (the parallel flat glass is converted into distance between lens elements) is TL, and the above parallel flat glass is the low pass filter or cover glass.

If the value of TL/f is lower than the lower limit of the relation (4), the optical system will become so small that the shape and thickness of the optical system are difficult to manufacture, and the characteristic of the incident angle will not be good.

If the value of TL/f is higher than the upper limit of the relation (4), the optical system will become large, so that the requirement of miniaturization can not be satisfied.

And it will be better if the present invention satisfies the relation:

$$0.18 < d2/f < 0.32 \quad (5)$$

The distance between the first lens element and the second lens element is d2.

If the value of d2/f is lower than the lower limit of the relation (5), the distance between the first lens element with positive refractive power and the second lens element with negative refractive power will become narrow, the even off axis performance will not be good and the aberration can not be corrected effectively.

If the value of d2/f is higher than the upper limit of the relation (5), the distance between the first lens element and the second lens element will become too wide, and the outer diameter of the second lens element accordingly becomes large, so that the requirement of miniaturization can not be satisfied. In addition, the gap also becomes large.

And it will be better if the present invention satisfies the relation:

$$-3.65 < (r1+r2)/(r1-r2) < -1.50 \quad (6)$$

The radius of curvature of the object-side surface of the first lens element is r1, and the radius of curvature of the image-side surface of the first lens element is r2.

If the value of (r1+r2)/(r1−r2) is lower than the lower limit of the relation (6), the back focal length can be ensured, but the spherical aberration will become large.

If the value of (r1+r2)/(r1−r2) is higher than the upper limit of the relation (6), the back focal length will become short.

And it will be better if the present invention satisfies the relation:

$$-1.3 < r3/f < -0.5 \quad (7)$$

The radius of curvature of the object-side surface of the second lens element is r3.

If the value of r3/f is lower than the lower limit of the relation (7), the amount of sag of the peripheral portion of the second lens element will be increased, so that the lens element can not be formed easily.

If the value of r3/f is higher than the upper limit of the relation (7), the negative refractive power of the second lens element will become strong, and the total length of the lens element will become too long.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1A:
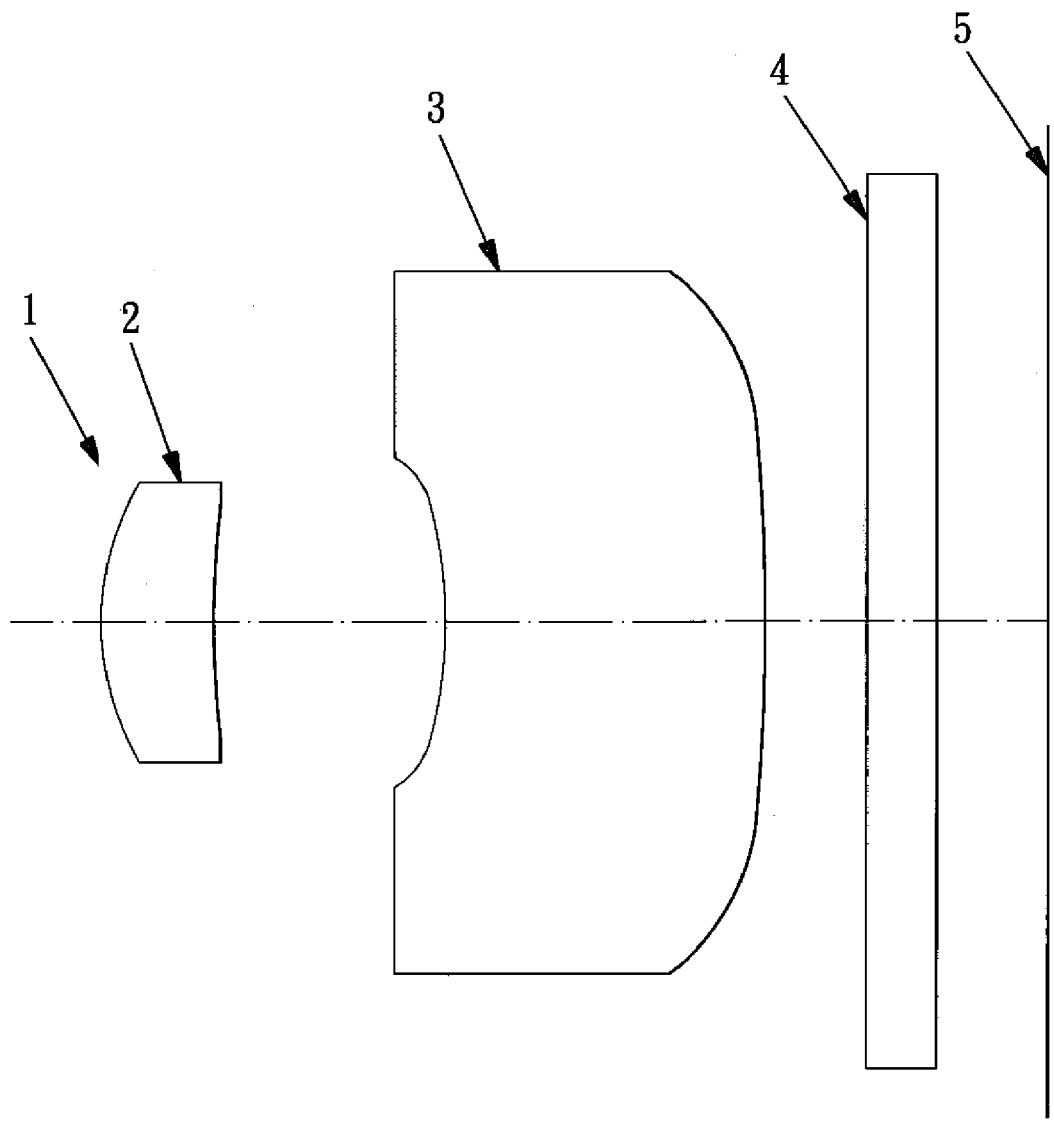
FIG. 1A shows an optical lens system for taking image in accordance with a first embodiment of the present invention.
Figure 1B:
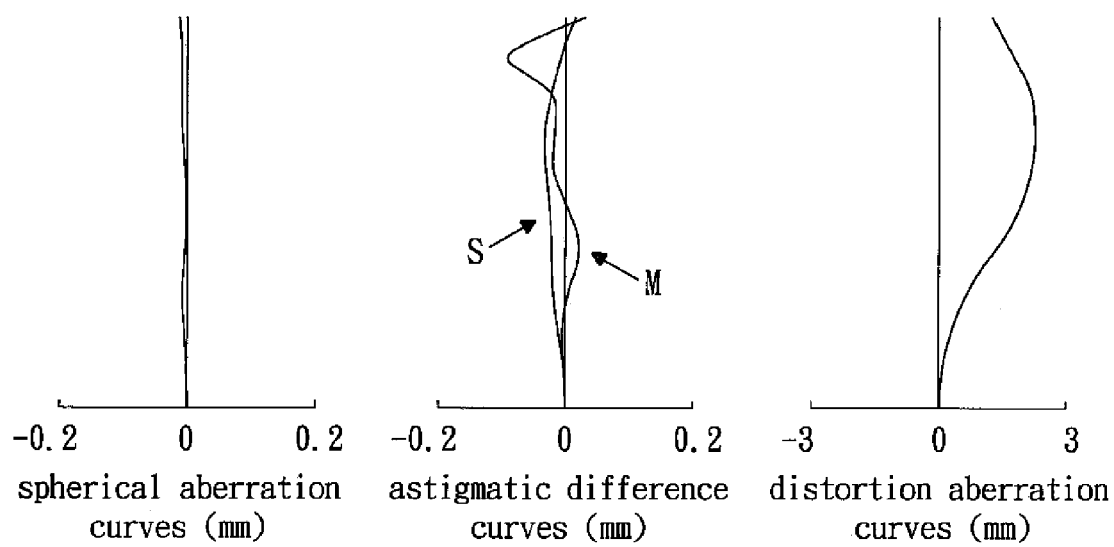
FIG. 1B shows a spherical aberration, an astigmatic difference, and a distortion aberration of the first embodiment of the present invention.
Figure 2A:
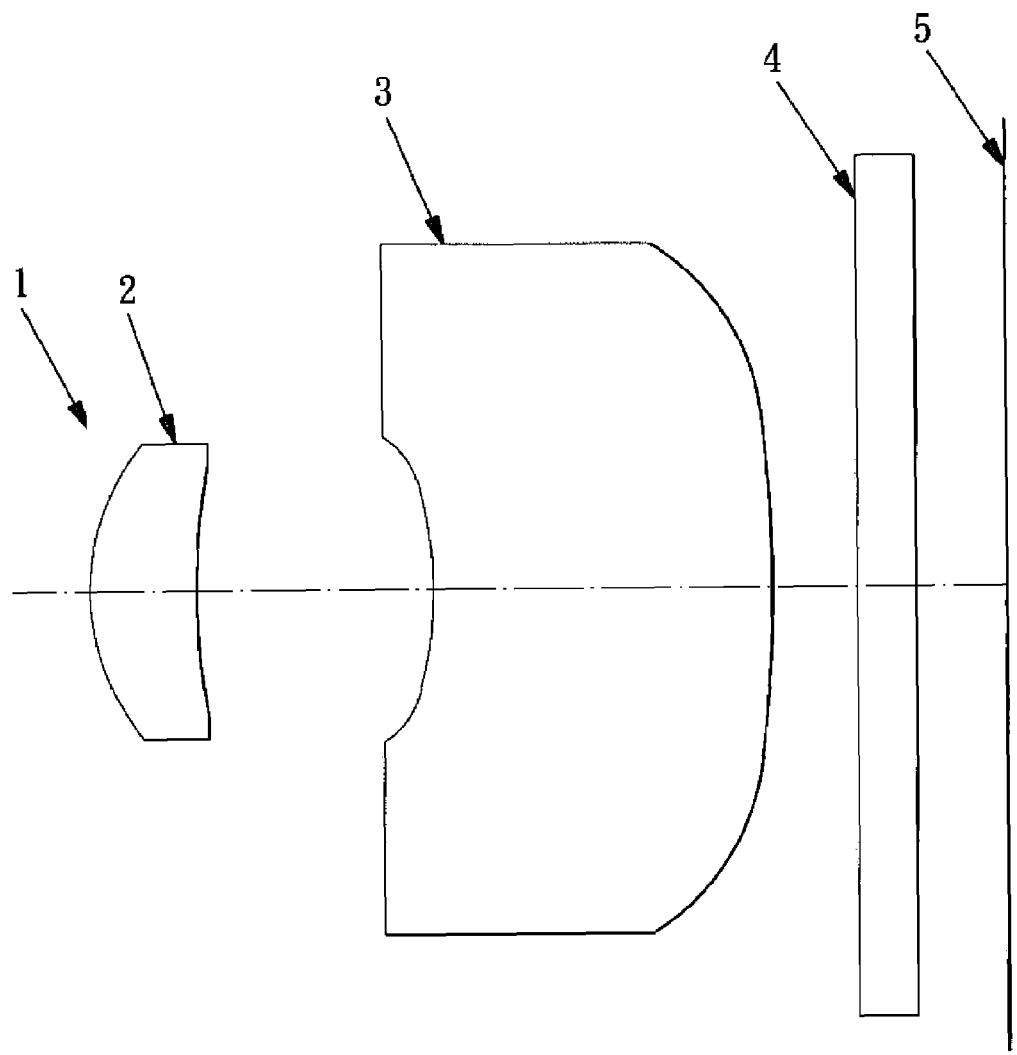
FIG. 2A shows an optical lens system for taking image in accordance with a second embodiment of the present invention.
Figure 2B:
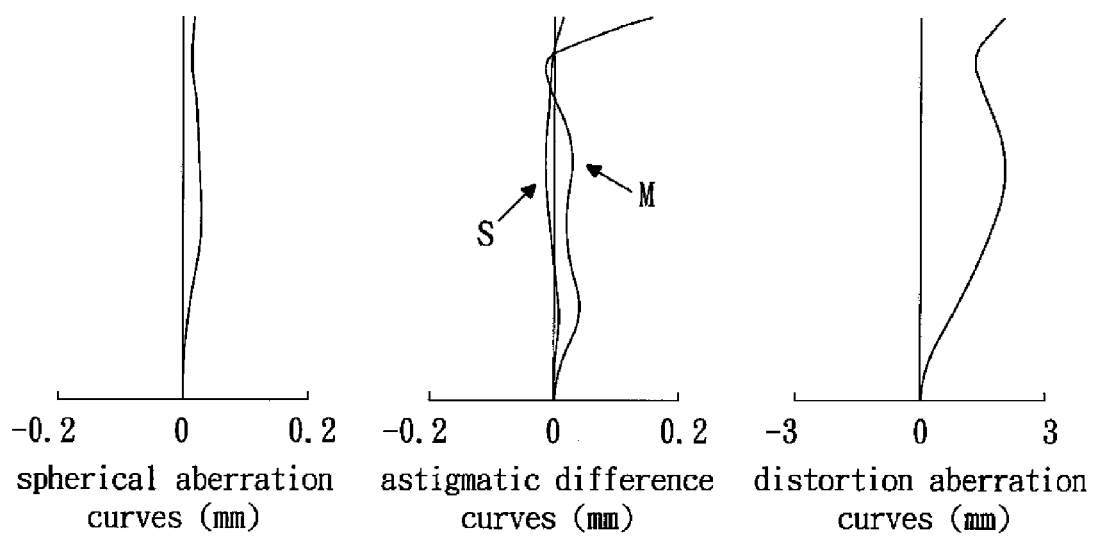
FIG. 2B shows the spherical aberration, the astigmatic difference, and the distortion aberration of the second embodiment of the present invention.
Figure 3A:
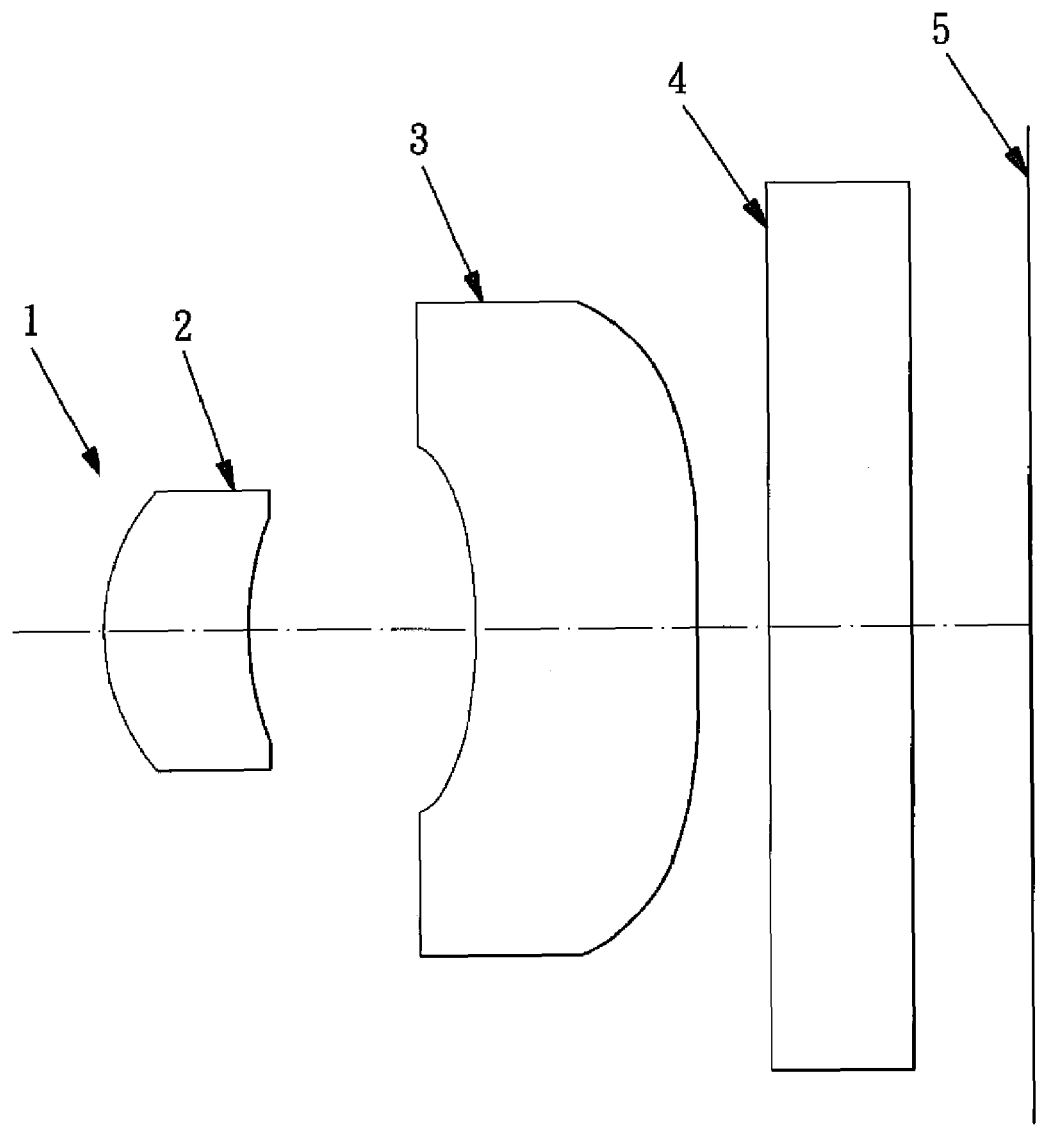
FIG. 3A shows an optical lens system for taking image in accordance with a third embodiment of the present invention.
Figure 3B:
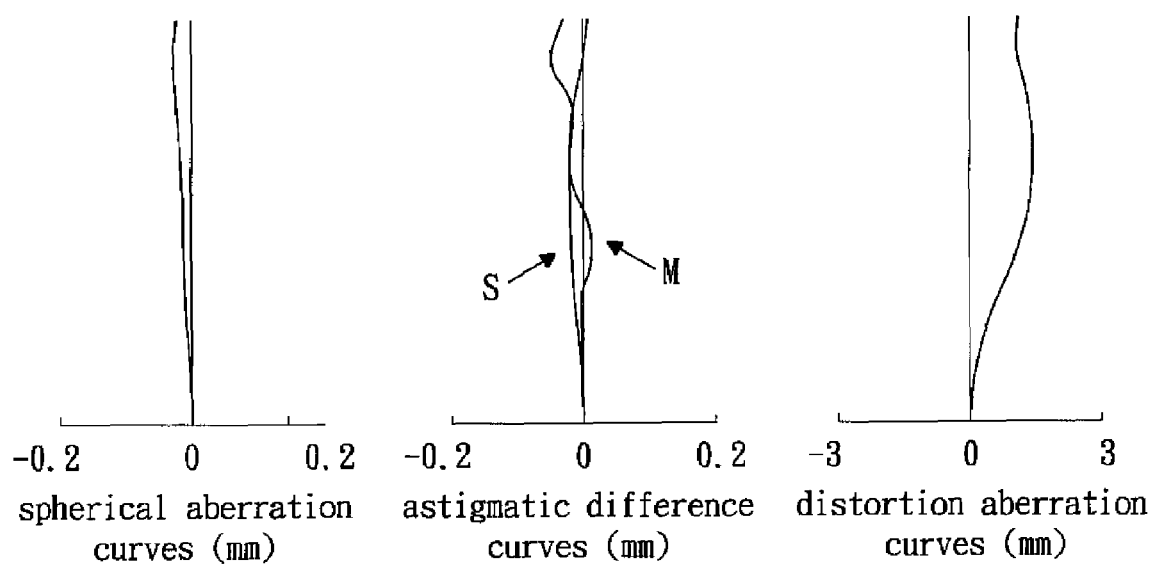
FIG. 3B shows the spherical aberration, the astigmatic difference, and the distortion aberration of the third embodiment of the present invention.
Figure 4A:
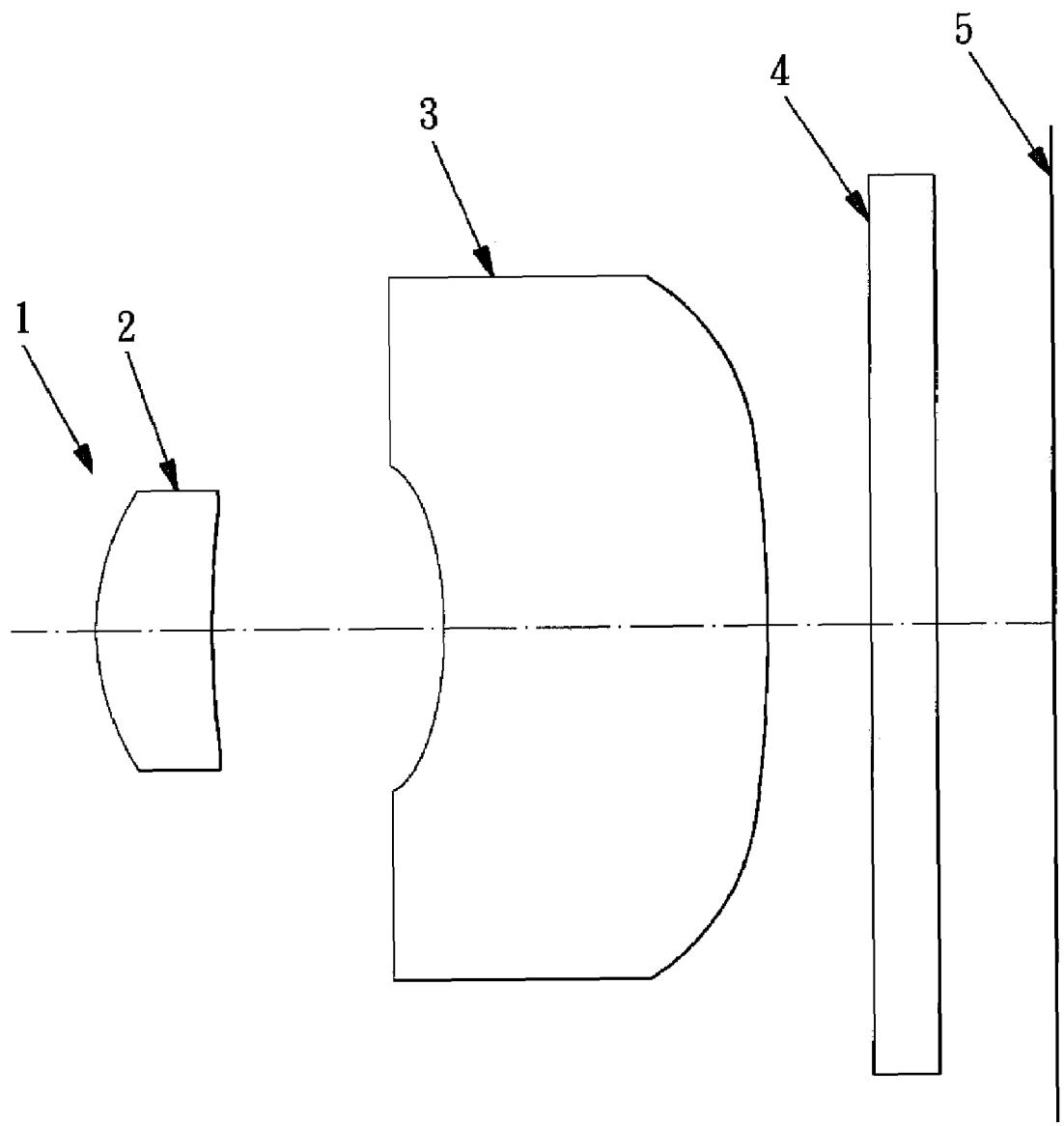
FIG. 4A shows an optical lens system for taking image in accordance with a fourth embodiment of the present invention.
Figure 4B:
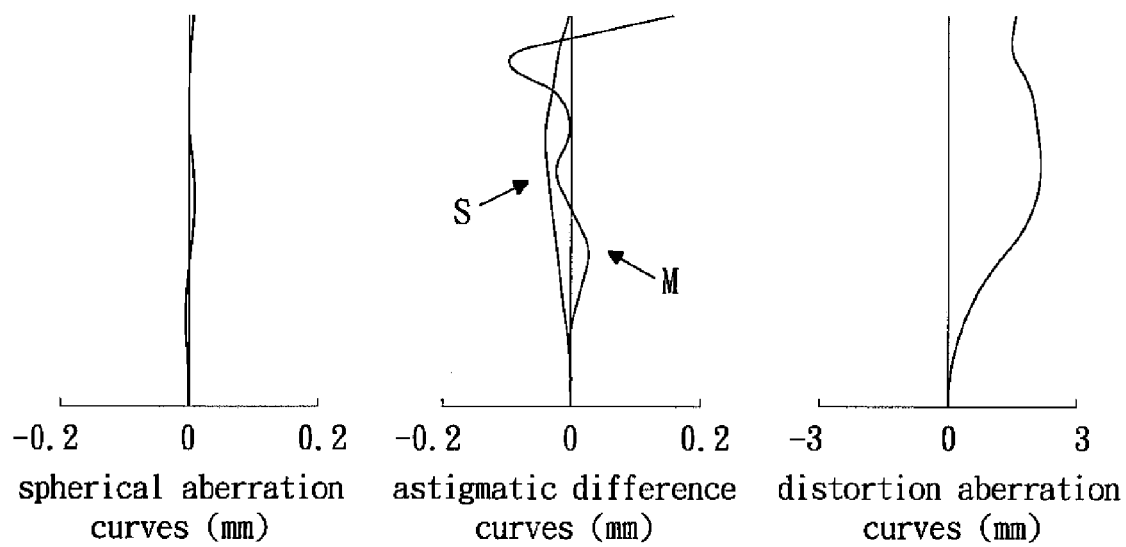
FIG. 4B shows the spherical aberration, the astigmatic difference, and the distortion aberration of the fourth embodiment of the present invention.
Figure 5A:
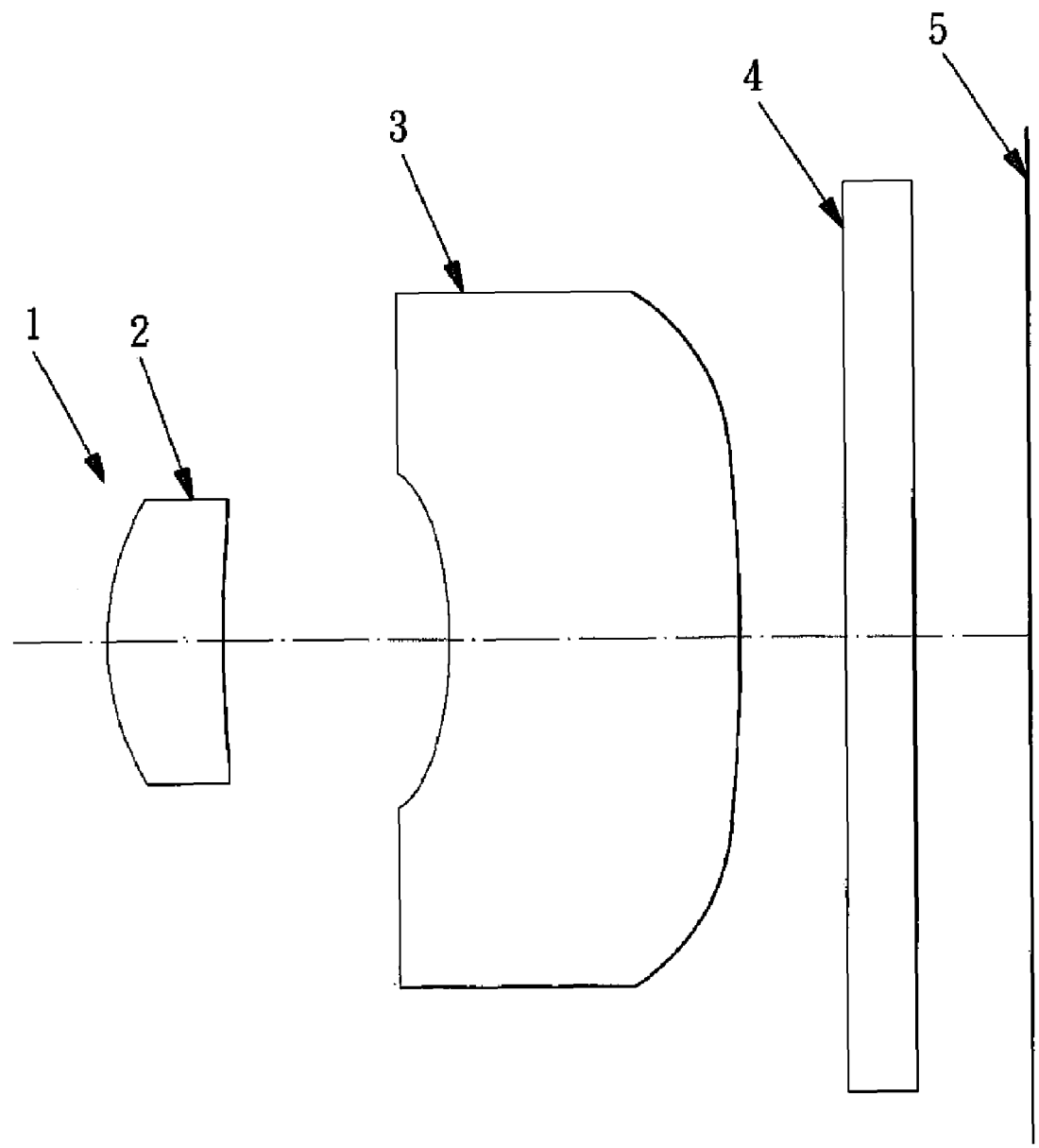
FIG. 5A shows an optical lens system for taking image in accordance with a fifth embodiment of the present invention.
Figure 5B:
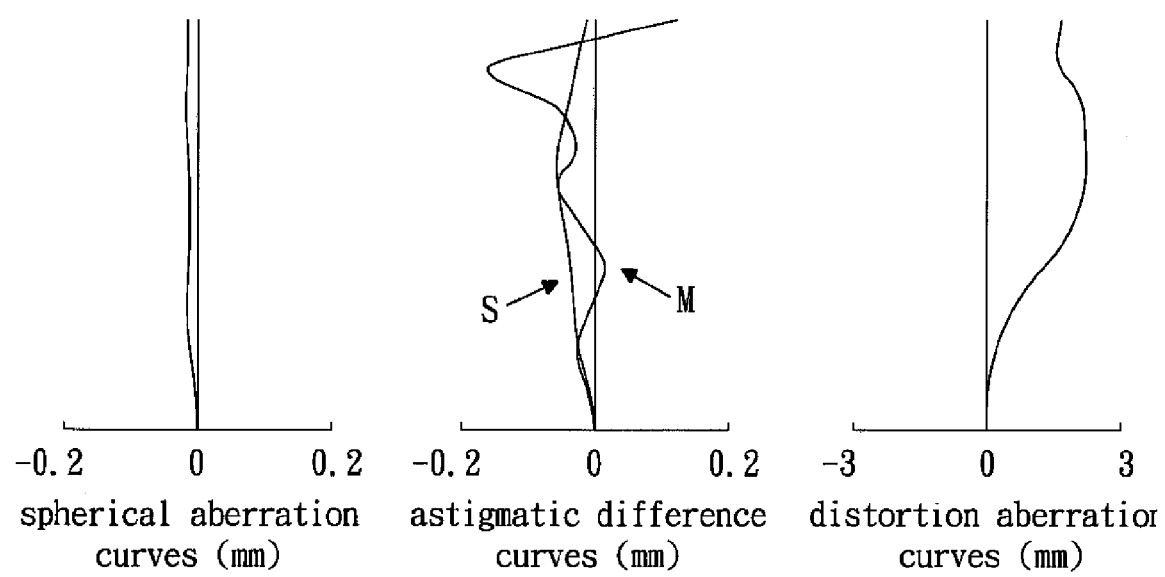
FIG. 5B shows the spherical aberration, the astigmatic difference, and the distortion aberration of the fifth embodiment of the present invention.
Figure 6A:
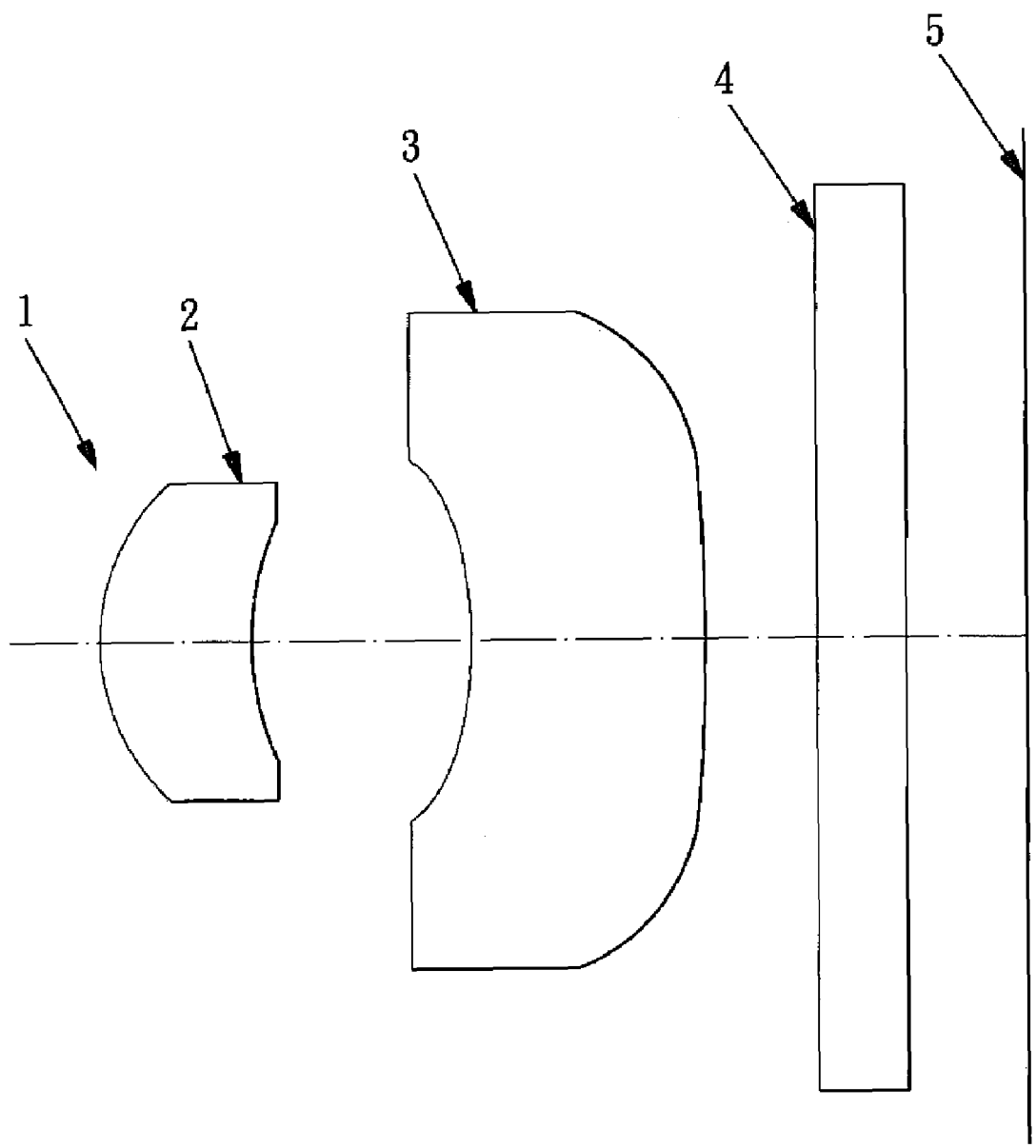
FIG. 6A shows an optical lens system for taking image in accordance with a sixth embodiment of the present invention.
Figure 6B:
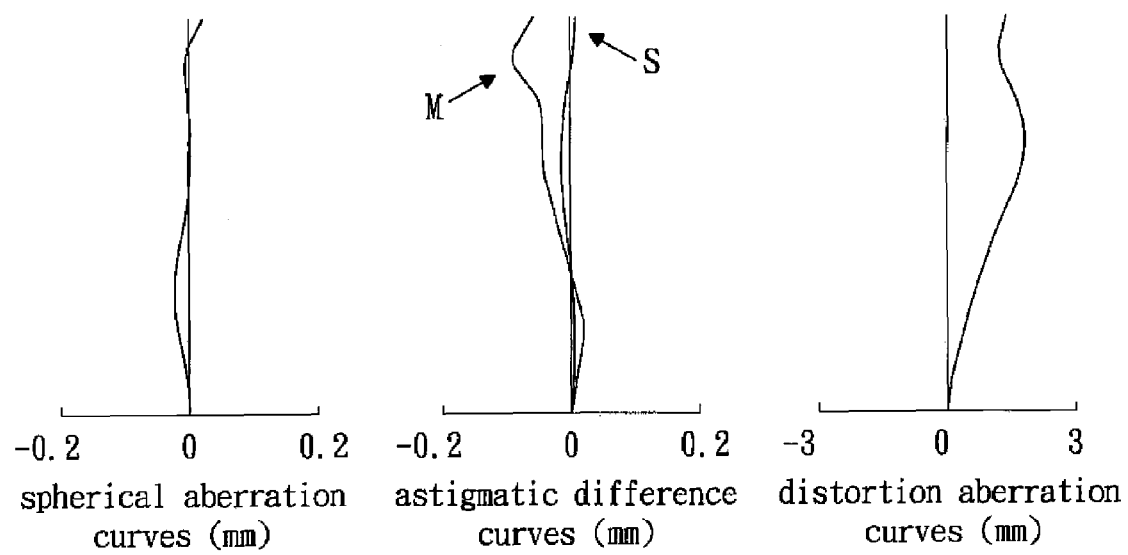
FIG. 6B shows the spherical aberration, the astigmatic difference, and the distortion aberration of the sixth embodiment of the present invention.
Figure 7A:
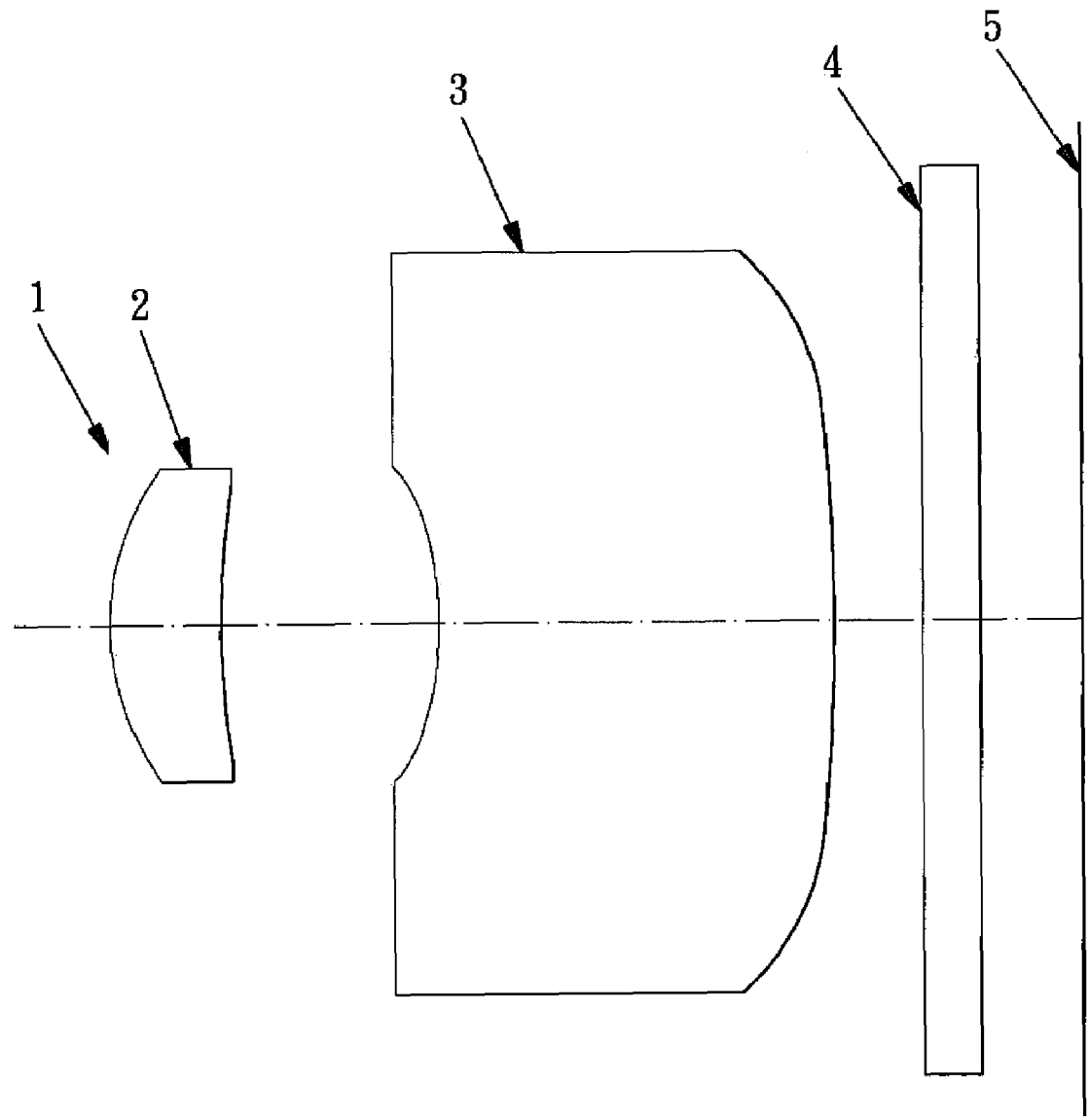
FIG. 7A shows an optical lens system for taking image in accordance with a seventh embodiment of the present invention.
Figure 7B:
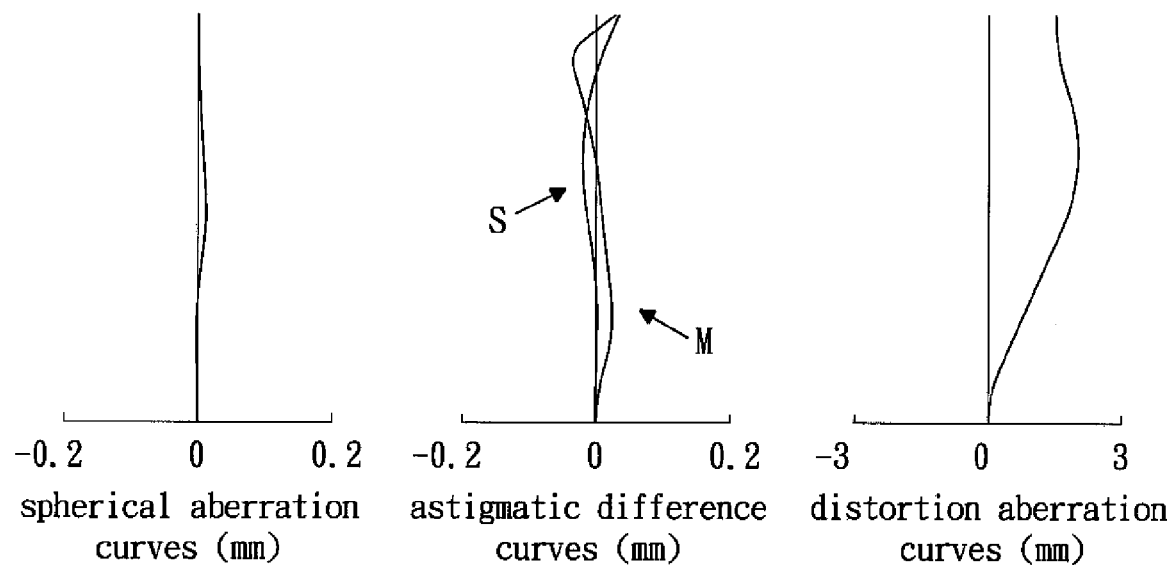
FIG. 7B shows the spherical aberration, the astigmatic difference, and the distortion aberration of the seventh embodiment of the present invention.
Figure 8A:
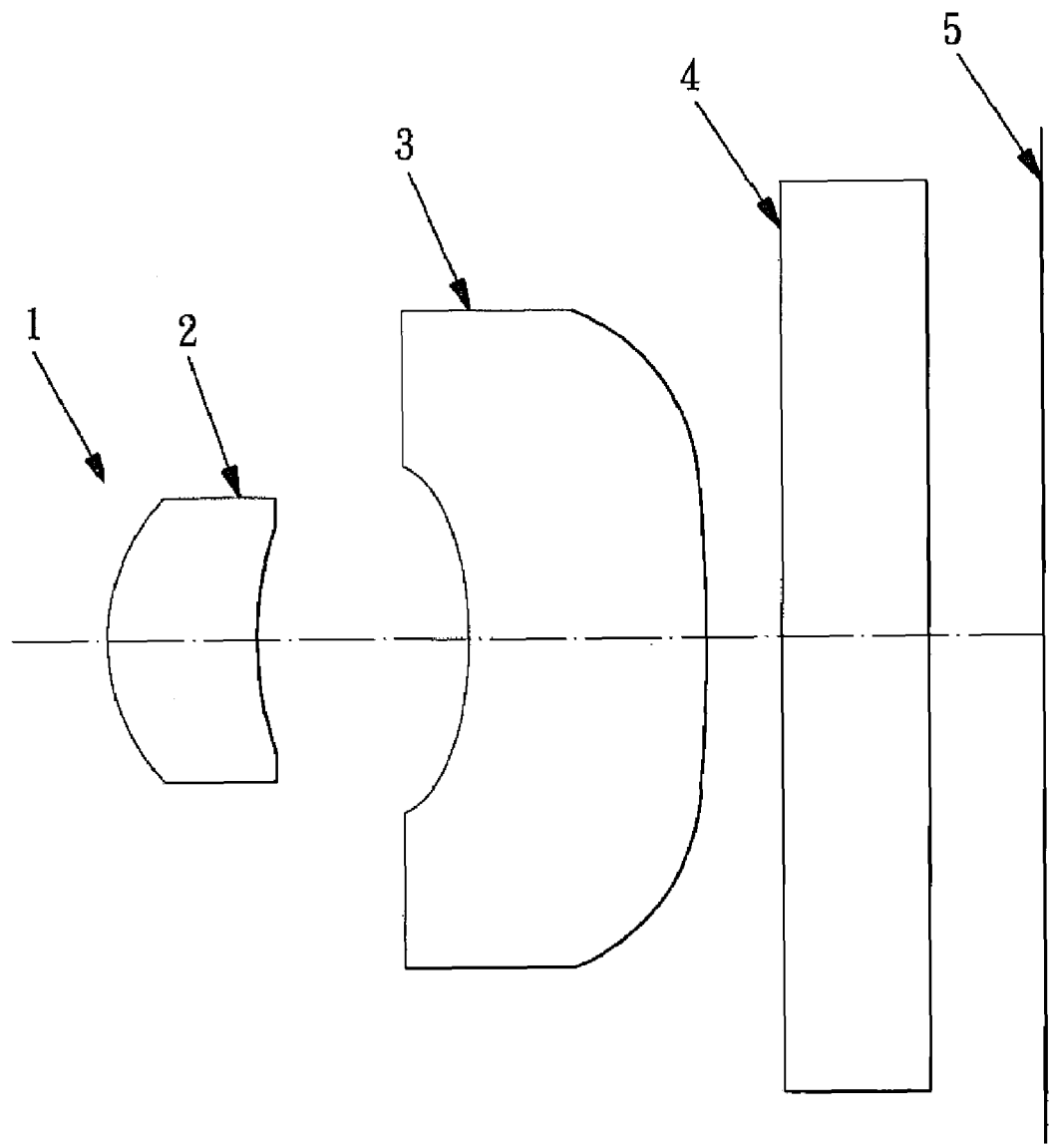
FIG. 8A shows an optical lens system for taking image in accordance with an eighth embodiment of the present invention.
Figure 8B:
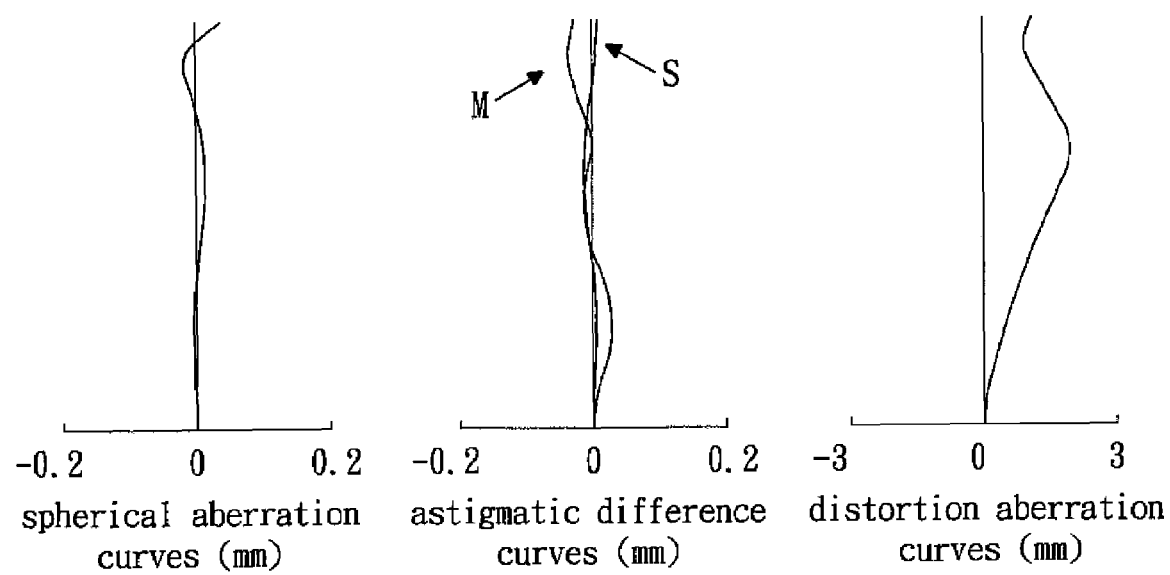
FIG. 8B shows the spherical aberration, the astigmatic difference, and the distortion aberration of the eighth embodiment of the present invention.
Figure 9A:
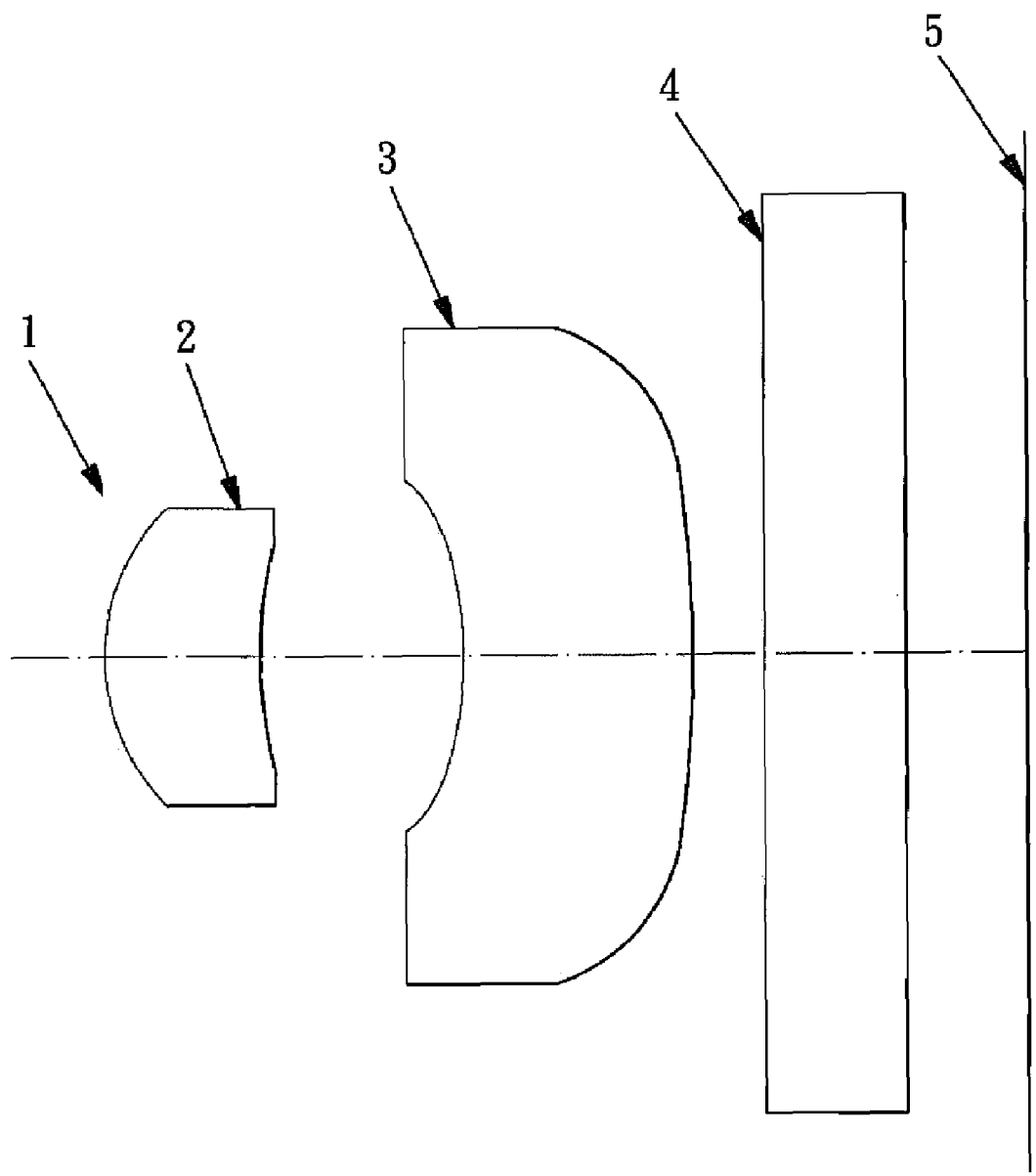
FIG. 9A shows an optical lens system for taking image in accordance with a ninth embodiment of the present invention.
Figure 9B:
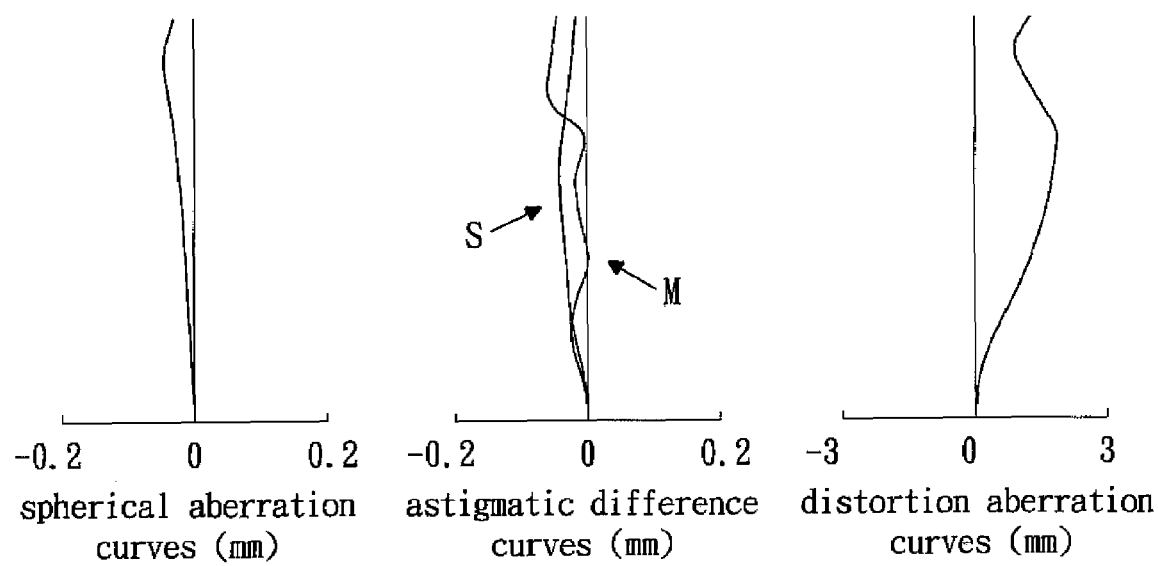
FIG. 9B shows the spherical aberration, the astigmatic difference, and the distortion aberration of the ninth embodiment of the present invention.

Referring to FIGS. 1-9, which show the optical lens systems (FIGS. 1A-9A) and the aberration correction (FIGS. 1B-9B) of embodiments 1-9. Tables 1A-9A and 1B-9B show the data of different embodiments. FIGS. 1B-9B show the spherical aberration (its unit is mm), astigmatic difference (its unit is mm), and distortion aberration (its unit is %). The prevent invention adopts a two-piece lens system, which is particularly suitable for use in the optical system of the portable machines, such as a mobile phone camera with a solid image sensor.

FIGS. 1A-9A show different optical arrangements of different embodiments. The optical lens systems of different embodiments comprise, from the object side: an aperture stop 1, a first lens element 2, a second lens element 3, a parallel flat glass 4, and an image plane 5. The parallel flat glass 4 has an infrared filter function and cooperates with the image plane 5 to protect the solid image sensors (CCD and CMOS).

The first lens element 2 is a positive meniscus lens element has a convex object-side surface. The second lens element 3 is a negative meniscus lens element has a convex image-side surface. Both the object-side surface and the image-side surface of the first lens element 2 and the second lens element 3 are aspheric, and the first lens element 2 and the second lens element 3 are made of plastic material.

Referring to the curves of the astigmatic difference of different figures, S represents the astigmatic difference of the sagittal plane, and T represents the astigmatic difference of the meridional plane. The data of the d line is also shown in the above figures. And it can be seen from these figures that the aberration of the present invention is compensated.

In the first embodiment of the present optical lens system for taking image:
the focal length of the optical lens system for taking image is f, and F=4.00 mm
Fno.=3.21
field of view 2ω=59.1°

Referring to table 1A, the Arabic numbers 1, 2, ... 6 represent the sequence number of the surfaces of the first lens element 2, the second lens element 3, and the parallel flat glass 4 from the object side. The r represents the paraxial radius of curvature (its unit is mm); d represents the thickness of the lens elements (its unit is mm); nd means the refractive index and vd means Abbe number. Numbers 5 and 6 represent both sides of the parallel flat glass 4 whose radius of curvature r is ∞. And all the embodiments of the present invention are the same in this point.

Table 1B shows the aspherical coefficients, the above surfaces of each lens element are aspheric. The aspherical coefficients of the respective lens elements are indicated by A, B, C, D and E, the height of the optical axis is H, and the deflection of the optical axis is X, and then a relation will be satisfied:

$$X=(1/R)H^2/\{1+[1-(1+K)(H/R)^2]^{1/2}\}+A\,H^4+BH^6+CH^8+DH^{10}+EH^{12}$$

The capital R in this relation represents the paraxial radius of curvature, K represents the conic coefficients, the aspherical coefficient E-03 represents $10^{-3}$. And all the embodiments of the present invention are the same in this point.

TABLE 1A

|  | r | d | nd | vd |
|---|---|---|---|---|
| Aperture Stop | ∞ | 0.000 | | |
| 1 | 1.2095 | 0.503 | 1.54340 | 56.5 |
| 2 | 4.3175 | 1.013 | | |
| 3 | −3.2164 | 1.424 | 1.63200 | 23.4 |
| 4 | −23.7226 | 0.460 | | |
| 5 | ∞ | 0.300 | 1.51680 | 64.2 |
| 6 | ∞ | 0.489 | | |

TABLE 1B

| Surface # | 1 | 2 | 3 | 4 |
|---|---|---|---|---|
| K = | 5.13693E−01 | −2.01029E+01 | 9.89833E−01 | −3.37706E+01 |
| A = | −3.38891E−02 | 1.66529E−02 | −1.83805E−01 | −4.13464E−02 |
| B = | −2.46407E−01 | 3.78489E−01 | −2.92570E−01 | −8.59505E−03 |
| C = | 1.94521E+00 | −3.49597E+00 | −8.51336E−01 | 6.22959E−03 |
| D = | −9.79369E+00 | 1.05518E+01 | 1.13853E+01 | −6.77233E−03 |
| E = | 2.47586E+01 | 2.10595E+00 | −4.69092E+01 | 4.13201E−03 |

In the second embodiment of the present optical lens system for taking image:
the focal length of the optical lens system for taking image is f, and f=4.62 mm
Fno.=2.92
field of view 2ω=56.0°
table 2A shows each component of the optical lens system, and table 2B shows the aspherical coefficient.

TABLE 2A

|  | r | D | nd | vd |
|---|---|---|---|---|
| Aperture Stop | ∞ | 0.000 | | |
| 1 | 1.3562 | 0.564 | 1.54340 | 56.5 |
| 2 | 5.0355 | 1.239 | | |
| 3 | −2.7596 | 1.828 | 1.63200 | 23.4 |
| 4 | −9.8418 | 0.449 | | |
| 5 | ∞ | 0.300 | 1.51680 | 64.2 |
| 6 | ∞ | 0.488 | | |

TABLE 2B

| Surface # | 1 | 2 | 3 | 4 |
|---|---|---|---|---|
| K = | 1.29242E−01 | 3.15006E−01 | −3.21073E−01 | −7.86269E+00 |
| A = | −9.08382E−04 | 2.70775E−02 | −1.91369E−01 | −2.08962E−02 |
| B = | −9.27818E−02 | −3.35055E−02 | 3.72625E−01 | −9.83922E−03 |
| C = | 6.37964E−01 | −1.38815E−01 | −2.20644E+00 | 6.10556E−03 |
| D = | −2.50149E+00 | 4.33982E−01 | 6.22376E+00 | −4.02529E−03 |
| E = | 5.15472E+00 | 3.42007E−01 | −1.17844E+01 | 1.51404E−03 |

In the third embodiment of the present optical lens system for taking image:
the focal length of the optical lens system for taking image is f, and f=3.14 mm
Fno.=3.22
field of view 2ω=58.1°
table 3A shows each component of the optical lens system, and table 3B shows the aspherical coefficient.

TABLE 3A

|  | r | d | nd | vd |
|---|---|---|---|---|
| Aperture Stop | ∞ | 0.000 | | |
| 1 | 0.8061 | 0.495 | 1.54340 | 56.5 |
| 2 | 1.5423 | 0.787 | | |
| 3 | −3.7096 | 0.774 | 1.63200 | 23.4 |
| 4 | −352.5598 | 0.253 | | |
| 5 | ∞ | 0.500 | 1.51680 | 64.2 |
| 6 | ∞ | 0.400 | | |

TABLE 3B

| Surface # | 1 | 2 | 3 | 4 |
|---|---|---|---|---|
| K = | 5.61761E−01 | 2.97022E−01 | −1.88710E+01 | 1.00000E+00 |
| A = | −4.39698E−02 | 3.24764E−01 | −4.33358E−01 | −1.35113E−01 |
| B = | −9.60236E−01 | 5.16416E−01 | 2.18731E−01 | −1.66172E−01 |
| C = | 9.73796E+00 | 2.85387E+00 | −1.59626E+01 | 3.39366E−01 |
| D = | −7.15122E+01 | −1.75796E+01 | 1.40289E+02 | −3.16976E−01 |
| E = | 2.96511E+02 | 2.60540E+02 | −5.88477E+02 | 4.94315E−02 |

In the fourth embodiment of the present optical lens system for taking image:
the focal length of the optical lens system for taking image is f, and f=4.00 mm
Fno.=3.21
field of view 2ω=58.9°
table 4A shows each component of the optical lens system, and table 4B shows the aspherical coefficient.

TABLE 4A

|  | r | d | nd | vd |
|---|---|---|---|---|
| Aperture Stop | ∞ | 0.000 | | |
| 1 | 1.1480 | 0.508 | 1.51357 | 56.8 |
| 2 | 4.4250 | 1.018 | | |
| 3 | −2.6737 | 1.424 | 1.63200 | 23.4 |
| 4 | −9.9728 | 0.460 | | |
| 5 | ∞ | 0.300 | 1.51680 | 64.2 |
| 6 | ∞ | 0.489 | | |

TABLE 4B

| Surface # | 1 | 2 | 3 | 4 |
|---|---|---|---|---|
| K = | 4.90158E−01 | −1.40193E+01 | −5.75445E+00 | −3.37687E+01 |
| A = | −3.92128E−02 | 1.87887E−02 | −2.32245E−01 | −4.16298E−02 |
| B = | −2.27515E−01 | 4.77155E−01 | −3.56468E−01 | −6.77383E−03 |
| C = | 1.87992E+00 | −4.04707E+00 | −2.28723E−01 | 1.57537E−03 |
| D = | −9.71245E+00 | 1.18076E+01 | 9.48334E+00 | −6.72410E−03 |
| E = | 2.46752E+01 | 3.00780E+00 | −4.91502E+01 | 6.09171E−03 |

In the fifth embodiment of the present optical lens system for taking image:

the focal length of the optical lens system for taking image is f, and f=3.80 mm Fno.=3.05 field of view 2ω=61.6° table 5A shows each component of the optical lens system, and table 5B shows the aspherical coefficient.

TABLE 5A

|  | r | d | nd | vd |
|---|---|---|---|---|
| Aperture Stop | ∞ | 0.000 | | |
| 1 | 1.2110 | 0.500 | 1.54340 | 56.5 |
| 2 | 4.5326 | 0.976 | | |
| 3 | −3.5189 | 1.265 | 1.60730 | 26.6 |
| 4 | −31.3702 | 0.460 | | |
| 5 | ∞ | 0.300 | 1.51680 | 64.2 |
| 6 | ∞ | 0.492 | | |

TABLE 5B

| Surface # | 1 | 2 | 3 | 4 |
|---|---|---|---|---|
| K = | 3.58145E−01 | −4.44131E+01 | 8.71123E−01 | 8.52248E−01 |
| A = | −2.54403E−02 | 1.13437E−02 | −1.60232E−01 | −4.81666E−02 |
| B = | −2.89336E−01 | 6.59310E−01 | −8.58893E−01 | −1.12689E−02 |
| C = | 2.20118E+00 | −5.61432E+00 | 1.79418E+00 | 8.69445E−03 |
| D = | −1.01746E+01 | 1.60916E+01 | 7.37499E+00 | −1.53795E−02 |
| E = | 2.37981E+01 | −1.16886E+00 | −5.73676E+01 | 1.22324E−02 |

In the sixth embodiment of the present optical lens system for taking image:

the focal length of the optical lens system for taking image is f, and f=3.19 mm Fno.=2.94 field of view 2ω=57.1° table 6A shows each component of the optical lens system, and table 6B shows the aspherical coefficient.

TABLE 6A

|  | r | d | nd | vd |
|---|---|---|---|---|
| Aperture Stop | ∞ | 0.000 | | |
| 1 | 0.7894 | 0.524 | 1.54340 | 56.5 |
| 2 | 1.4736 | 0.750 | | |
| 3 | −2.8978 | 0.799 | 1.63200 | 23.4 |
| 4 | −24.3264 | 0.385 | | |
| 5 | ∞ | 0.300 | 1.51680 | 64.2 |
| 6 | ∞ | 0.391 | | |

TABLE 6B

| Surface # | 1 | 2 | 3 | 4 |
|---|---|---|---|---|
| K = | 7.10189E−03 | −7.26930E−01 | −1.62371E+01 | −2.37479E+01 |
| A = | 6.29796E−02 | 1.31317E−01 | −8.05037E−01 | −2.36455E−01 |
| B = | −6.51339E−01 | 6.47390E+00 | 2.69337E+00 | 1.79767E−01 |
| C = | 1.14712E+01 | −5.47926E+01 | −2.51006E+01 | −1.94376E−01 |
| D = | −8.01281E+01 | 2.46547E+02 | 1.48383E+02 | 8.29011E−03 |
| E = | 3.01764E+02 | −2.37800E+02 | −5.82044E+02 | 8.63535E−02 |

In the seventh embodiment of the present optical lens system for taking image:

the focal length of the optical lens system for talking image is f, and f=0.60 mm Fno.=2.92 field of view 2ω=56.5° table 7A shows each component of the optical lens system, and table 7B shows the aspherical coefficient.

TABLE 7A

|  | r | d | nd | vd |
|---|---|---|---|---|
| Aperture Stop | ∞ | 0.000 | | |
| 1 | 1.3425 | 0.571 | 1.54340 | 56.5 |
| 2 | 5.2669 | 1.080 | | |
| 3 | −3.0317 | 1.980 | 1.63200 | 23.4 |
| 4 | −26.6517 | 0.449 | | |
| 5 | ∞ | 0.300 | 1.51680 | 64.2 |
| 6 | ∞ | 0.488 | | |

TABLE 7B

| Surface # | 1 | 2 | 3 | 4 |
|---|---|---|---|---|
| K = | 1.10618E−01 | −2.36552E−01 | −2.28303E+00 | 1.00000E+00 |
| A = | −8.17337E−04 | 2.47246E−02 | −1.81589E−01 | −1.46972E−02 |
| B = | −1.16572E−01 | 8.59359E−03 | 1.44908E−01 | −1.60219E−02 |
| C = | 6.78642E−01 | −3.33697E−01 | −1.36826E+00 | 1.24196E−02 |
| D = | −2.51847E+00 | 7.72366E−01 | 4.48092E+00 | −6.75955E−03 |
| E = | 5.08028E+00 | −1.01624E−01 | −9.68300E+00 | 2.22118E−03 |

In the eighth embodiment of the present optical lens system for taking image:

the focal length of the optical lens system for taking image is f, and f=3.13 mm Fno.=3.21 field of view 2ω=57.8° table 8A shows each component of the optical lens system, and table 8B shows the aspherical coefficient.

TABLE 8A

| | r | d | nd | vd |
|---|---|---|---|---|
| Aperture Stop | ∞ | 0.000 | | |
| 1 | 0.7348 | 0.505 | 1.49420 | 71.6 |
| 2 | 1.5635 | 0.724 | | |
| 3 | −2.2706 | 0.828 | 1.63200 | 23.4 |
| 4 | −10.0795 | 0.253 | | |
| 5 | ∞ | 0.500 | 1.51680 | 64.2 |
| 6 | ∞ | 0.397 | | |

TABLE 8B

| Surface # | 1 | 2 | 3 | 4 |
|---|---|---|---|---|
| K = | 1.13364E−01 | −2.80266E+00 | −4.01612E+01 | −1.36994E+01 |
| A = | −6.37307E−03 | 3.03256E−01 | −1.15091E+00 | −2.09078E−01 |
| B = | −3.15177E−01 | 5.93720E+00 | 3.65521E+00 | 1.63913E−01 |
| C = | 1.01027E+01 | −4.95726E+01 | −2.39585E+01 | −1.78355E−01 |
| D = | −8.51753+01 | 1.38543E+02 | 1.26209E+02 | −1.16812E−02 |
| E = | 3.31819E+02 | 9.12385E+02 | −5.70006E+02 | 5.95663E−02 |

In the ninth embodiment of the present optical lens system for taking image:

the focal length of the optical lens system for taking image is f, and f=3.08 mm Fno.=2.95 field of view 2ω=61.5° table 9A shows each component of the optical lens system, and table 9B shows the aspherical coefficient.

TABLE 9A

| | r | d | nd | vd |
|---|---|---|---|---|
| Aperture Stop | ∞ | 0.000 | | |
| 1 | 0.7695 | 0.536 | 1.49420 | 71.6 |
| 2 | 1.7391 | 0.714 | | |
| 3 | −2.5825 | 0.810 | 1.71000 | 35.0 |
| 4 | −7.9486 | 0.250 | | |
| 5 | ∞ | 0.500 | 1.51680 | 64.2 |
| 6 | ∞ | 0.391 | | |

TABLE 9B

| Surface # | 1 | 2 | 3 | 4 |
|---|---|---|---|---|
| K = | −2.38111E−02 | −9.51996E−01 | −8.61175E−01 | 1.00000E+00 |
| A = | 7.54939E−02 | 3.88981E−01 | −1.69855E−01 | −2.98493E−02 |
| B = | −9.20573E−01 | −6.55625E−01 | −2.43226E+00 | −4.71325E−01 |
| C = | 1.32884E+01 | 2.81058E+01 | −8.80176E−01 | 9.95531E−01 |
| D = | −8.64652E+01 | −2.81394E+02 | 1.11711E+02 | −1.12620E+00 |
| E = | 3.15706E+02 | 1.69623E+03 | −6.99084E+02 | 5.68837E−01 |

The above present optical lens system for taking image comprises the first lens element 2 and the second lens element 3. The focal length of the optical lens system is f, the focal length of the first lens element 2 is f1, the focal length of the second lens element 3 is f2, the Abbe number of the first lens element 2 is ν1, the Abbe number of the second lens element 3 is ν2, and they satisfy the relations:

$$0.55 < f1/f < 0.95 \quad (1)$$

$$-2.0 < f2/f < -1.0 \quad (2)$$

$$27.0 < \nu1 - \nu2 \quad (3)$$

If the value of f1/f is lower than the lower limit of the relation (1), the refractive power of the second lens element 3 will become too strong, the back focal length will become short, and the astigmatic difference and comatic aberration will not be good.

If the value of f1/f is higher than the upper limit of the relation (1), the positive refractive power of the first lens element 2 will become weak, and the total length of the optical lens system will become too long.

If the value of f2/f is lower than the lower limit of the relation (2), the refractive power of the second lens element 3 will become too small, the chromatic aberration of magnification will not be sufficiently corrected, so that the peripheral performances will be worse.

If the value of f2/f is higher than the upper limit of the relation (2), the negative refractive power of the second lens element 3 will become too strong. Thereby, in order to balance the chromatic aberration, the positive refractive power of the first lens element 2 must become strong, so that the manufacturing error of the eccentric also increases.

If the value of ν1−ν2 is lower than the lower limit of the relation (3), the chromatic aberration will not be sufficiently corrected, so that the requirement of the solid image sensor such as CCD or CMOS with a high resolution can not be satisfied.

The distance from the object-side surface of the first lens element 2 to the image plane (the parallel flat glass is converted into distance between lens elements) is TL, and it satisfies the relation:

$$0.85 < TL/f < 1.15 \quad (4)$$

If the value of TL/f is lower than the lower limit of the relation (4), the optical system will become so small that the shape and thickness of the optical system are difficult to manufacture, and the characteristic of the incident angle will not be good.

If the value of TL/f is higher than the upper limit of the relation (4), the optical system will become large, so that the requirement of miniaturization can not be satisfied.

The distance between the first lens element 2 and the second lens element 3 is d2, and it satisfies the relation:

$$0.18 < d2/f < 0.32 \quad (5)$$

If the value of d2/f is lower than the lower limit of the relation (5), the distance between the first lens element 2 with positive refractive power and the second lens element 3 with negative refractive power will become narrow, the even off axis performance will not be good and the aberration can not be corrected effectively.

If the value of d2/f is higher than the upper limit of the relation (5), the distance between the first lens element 2 and the second lens element 3 will become too wide, and the outer diameter of the second lens element 3 accordingly becomes large, so that the requirement of miniaturization can not be satisfied. In addition, the gap also becomes large.

The radius of curvature of the object-side surface of the first lens element 2 is r1, and the radius of curvature of the image-side surface of the first lens element 2 is r2, and they satisfy the relation:

$$-3.65 < (r1+r2)/(r1-r2) < -1.50 \quad (6)$$

If the value of (r1+r2)/(r1−r2) is lower than the lower limit of the relation (6), the back focal length can be ensured, but the spherical aberration will become large.

If the value of (r1+r2)/(r1−r2) is higher than the upper limit of the relation (6), the back focal length will become short.

The radius of curvature of the object-side surface of the second lens element 3 is r3, and it satisfies the relation:

$$-1.3 < r3/f < -0.5 \quad (7)$$

If the value of r3/f is lower than the lower limit of the relation (7), the amount of sag of the peripheral portion of the second lens element 3 will be increased, so that the second lens element 3 can not be formed easily.

If the value of r3/f is higher than the upper limit of the relation (7), the negative refractive power of the second lens element 3 will become strong, and the total length of the lens element will become too long.

The parameters of the above relations of the embodiments are shown in tables 10 and 11, and the maximum incident angle of the image lens assembly is a.

TABLE 10

|  | Embodiment 1 | Embodiment 2 | Embodiment 3 | Embodiment 4 | Embodiment 5 |
| --- | --- | --- | --- | --- | --- |
| f1/f | 0.73 | 0.70 | 0.80 | 0.72 | 0.76 |
| f2/f | −1.51 | −1.46 | −1.89 | −1.56 | −1.75 |
| v1 − v2 | 33.09 | 33.09 | 33.09 | 33.41 | 29.85 |
| TL/f | 1.02 | 1.03 | 0.97 | 1.03 | 1.02 |
| d2/f | 0.25 | 0.27 | 0.25 | 0.25 | 0.26 |
| (r1 + r2)/(r1 − r2) | −1.78 | −1.74 | −3.19 | −1.70 | −1.73 |
| r3/f | −0.80 | −0.60 | −1.18 | −0.67 | −0.93 |
| A | 26.1° | 22.9° | 27.9° | 25.3° | 27.3° |

TABLE 11

|  | Embodiment 6 | Embodiment 7 | Embodiment 8 | Embodiment 9 |
| --- | --- | --- | --- | --- |
| f1/f | 0.77 | 0.68 | 0.74 | 0.77 |
| f2/f | −1.65 | −1.21 | −1.54 | −1.86 |
| v1 − v2 | 33.09 | 33.09 | 48.20 | 36.60 |
| TL/f | 0.95 | 1.03 | 0.97 | 0.98 |
| d2/f | 0.23 | 0.23 | 0.23 | 0.23 |
| (r1 + r2)/(r1 − r2) | −3.31 | −1.68 | −2.77 | −2.59 |
| r3/f | −0.91 | −0.66 | −0.72 | −0.84 |
| a | 27.8° | 25.2° | 27.7° | 28.0° |

It is to be noted that the lens elements in accordance with the present invention are plastic. For example, the second lens element 3 can be made of Lumiplus manufactured by Gas and its nd is 1.71. In addition, the present invention is not limited to use plastic material.

To summarize, the optical lens system for taking image of the present invention comprises two plastic lens elements, which provides suitable refractive power and astigmatic difference, and improves the optical characteristics of the optical lens system for taking image.

While we have shown and described various embodiments in accordance with the present invention, it should be clear to those skilled in the art that further embodiments may be made without departing from the scope of the present invention.

What is claimed is:

1. A two-piece optical lens system for taking image comprising an aperture stop, a first lens element and a second lens element, from an object side wherein:

the first lens element is a positive meniscus lens element has a convex object-side surface;

the second lens element is a negative meniscus lens element has a convex image-side surface;

both object-side surface and image-side surface of each lens element are aspheric, the first and second lens elements are made of plastic material, and they satisfy the relations:

$$0.55 < f1/f < 0.95;$$

$$-2.0 < f2/f < -1.0;$$

$$27.0 < v1 - v2;$$

a focal length of the optical lens system is f, a focal lens of the first lens element is f1, the focal length of the second lens system is f2, an Abbe number of the first lens element is v1, and the Abbe number of the second lens element is v2.

2. The two-piece optical lens system for taking image as claimed in claim 1, wherein a distance from an object-side surface of the first lens element to an image plane is TL, and it satisfies the relation: 0.85<TL/f<1.15.

3. The two-piece optical lens system for taking image as claimed in claim 2, wherein a distance between the first lens element and the second lens element is d2, and it satisfies the relation: 0.18<(d2/f<0.32.

4. The two-piece optical lens system for taking image as claimed in claim 3, wherein a radius of curvature of an object-side surface of the first lens element is r1, the radius of curvature of an image-side surface of the first lens element is r2, and they satisfy the relation: −3.65<(r1+r2)/(r1−r2)<−1.50.

5. The two-piece optical lens system for taking image as claimed in claim 3, wherein a radius of curvature of the object-side surface of the second lens element is r3, and it satisfies the relation: −1.3<r3/f<−0.5.

6. The two-piece optical lens system for taking image as claimed in claim 2, wherein a radius of curvature of an object-side surface of the first lens element is r1, the radius of curvature of an image-side surface of the first lens element is r2, and they satisfy the relation: −3.65<(r1+r2)/(r1−r2)<−1.50.

7. The two-piece optical lens system for taking image as claimed in claim 6, wherein a radius of curvature of the object-side surface of the second lens element is r3, and it satisfies the relation: −1.3<r3/f<−0.5.

8. The two-piece optical lens system for taking image as claimed in claim 2, wherein a radius of curvature of an object-side surface of the second lens element is r3, and it satisfies the relation: −1.3<r3/f<−0.5.

9. The two-piece optical lens system for taking image as claimed in claim 1, wherein a distance between the first lens element and the second lens element is d2, and it satisfies the relation: 0.18<(d2/f<0.32.

10. The two-piece optical lens system for taking image as claimed in claim 9, wherein a radius of curvature of an object-side surface of the first lens element is r1, the radius of curvature of an image-side surface of the first lens element is r2, and they satisfy the relation: $-3.65<(r1+r2)/(r1-r2)<-1.50$.

11. The two-piece optical lens system for taking image as claimed in claim 9, wherein a radius of curvature of the object-side surface of the second lens element is r3, and it satisfies the relation: $-1.3<r3/f<-0.5$.

12. The two-piece optical lens system for taking image as claimed in claim 1, wherein a radius of curvature of an object-side surface of the first lens element is r1, the radius of curvature of an image-side surface of the first lens element is r2, and they satisfy the relation: $-3.65<(r1+r2)/(r1-r2)<-1.50$.

13. The two-piece optical lens system for taking image as claimed in claim 12, wherein a radius of curvature of the object-side surface of the second lens element is r3, and it satisfies the relation: $-1.3<r3/f<-0.5$.

14. The two-piece optical lens system for taking image as claimed in claim 1, wherein a radius of curvature of an object-side surface of the second lens element is r3, and it satisfies the relation: $-1.3<r3/f<-0.5$.

* * * * *